US008582005B2

(12) United States Patent
Subbotin

(10) Patent No.: US 8,582,005 B2
(45) Date of Patent: *Nov. 12, 2013

(54) METHOD, APPARATUS AND SYSTEM PROVIDING ADJUSTMENT OF PIXEL DEFECT MAP

(75) Inventor: Igor Subbotin, South Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 212 days.

This patent is subject to a terminal disclaimer.

(21) Appl. No.: 13/052,660

(22) Filed: Mar. 21, 2011

(65) Prior Publication Data

US 2011/0193998 A1 Aug. 11, 2011

Related U.S. Application Data

(63) Continuation of application No. 11/509,712, filed on Aug. 25, 2006, now Pat. No. 7,932,938.

(51) Int. Cl.
*H04N 5/217* (2011.01)
*H04N 9/64* (2006.01)

(52) U.S. Cl.
USPC ............................ 348/247; 348/241; 348/246

(58) Field of Classification Search
USPC ......... 348/175, 176, 177, 178, 179, 180, 187, 348/189, 241, 243, 244, 246, 247, 250, 251
See application file for complete search history.

(56) References Cited

U.S. PATENT DOCUMENTS

| 5,416,516 | A | * | 5/1995 | Kameyama et al. .......... 348/246 |
| 6,650,789 | B2 | | 11/2003 | Edgar et al. |
| 6,683,995 | B2 | | 1/2004 | Ford et al. |
| 6,711,302 | B1 | | 3/2004 | Lee |
| 6,763,084 | B2 | * | 7/2004 | Boehm et al. ................... 378/62 |
| 6,806,902 | B1 | | 10/2004 | Donovan |
| 6,819,358 | B1 | * | 11/2004 | Kagle et al. .................... 348/246 |
| 6,919,568 | B2 | * | 7/2005 | Odogba et al. ........... 250/370.09 |
| 7,365,783 | B2 | | 4/2008 | Hashimoto et al. |
| 2001/0052938 | A1 | | 12/2001 | Itoh |
| 2002/0121915 | A1 | | 9/2002 | Alonso et al. |
| 2003/0109952 | A1 | | 6/2003 | Hosoya et al. |
| 2003/0179418 | A1 | | 9/2003 | Wengender et al. |
| 2004/0179738 | A1 | | 9/2004 | Dai et al. |
| 2005/0078204 | A1 | * | 4/2005 | Matsuoka et al. ............. 348/247 |
| 2006/0044425 | A1 | | 3/2006 | Yeung et al. |

OTHER PUBLICATIONS

Johnathon Fewkes et al., Enhance picture quality using advanced camera system, Micron Technology, Inc., published Apr. 18, 2005.

* cited by examiner

*Primary Examiner* — Lin Ye
*Assistant Examiner* — Peter Chon
(74) *Attorney, Agent, or Firm* — Dickstein Shapiro LLP

(57) ABSTRACT

A method, apparatus and system that allows for the identification of defective pixels, for example, defective pixel clusters, in an imager device. The method, apparatus and system determine, during use of the imager device, that a pixel defect, e.g., cluster defect, exists and accurately maps the location of the defective pixel. By analyzing more than one frame of an image, the method increases the accuracy of the defect mapping, which is used to improve the quality of the resulting image data.

18 Claims, 5 Drawing Sheets

| 10 | 11 | 12 | 13 | 14 | 15 |
|----|----|----|----|----|----|
| 20 | 21 | 22 | 23 | 24 | 25 |
| 30 | 31 | 32 | 33 | 34 | 35 |
| 40 | 41 | 42 | 43 | 44 | 45 |
| 50 | 51 | 52 | 53 | 54 | 55 |
| 60 | 61 | 62 | 63 | 64 | 65 |

FIG. 1

METHOD, APPARATUS AND SYSTEM PROVIDING ADJUSTMENT OF PIXEL DEFECT MAP

CROSS-REFERENCE TO RELATED APPLICATIONS

This application is a continuation of U.S. patent application No. 11/509,712, filed on Aug. 25, 2006, now U.S. Pat. No. 7,932,938 the subject matter of which is incorporated in its entirety by reference herein.

FIELD OF THE INVENTION

Embodiments of the invention relate generally to the field of solid state imager devices, and more particularly to methods, apparatuses and systems for accurately mapping pixel defects in a solid state imager devices.

BACKGROUND OF THE INVENTION

Solid state imager devices, including charge coupled devices (CCD) and CMOS imagers, among other types, have been used in photo imaging applications. A solid state imager device includes a focal plane array of pixel cells, each one of the cells including a photosensor, which may be a photogate, photoconductor or a photodiode having a doped region for accumulating photo-generated charge.

During the manufacture of solid state imager devices, the creation of defective pixels is unavoidable. Some of the pixels in the imager device may be always dark (often due to shorts) or always too bright (often due to abnormally high leakage current). These defective pixels, if not corrected, can cause severe degradation of image quality and, as a result, decrease the yield of parts during production. Thus, minimization of these pixel defects during fabrication using dose manufacturing tolerances will yield a higher quality product. However, it is usually less expensive to make an imager device using less precise manufacturing tolerances. In general, semiconductor devices produced using less precise manufacturing tolerances have a higher probability of defects. Typical semiconductor fabrication rules define some tradeoff between the quality (i.e., lack of defects) and cost of manufacture. The manufactured semiconductor devices are tested for defects, and any semiconductor device having more than a certain number of defects is usually discarded.

Image acquisition semiconductor devices (i.e., imager devices) are sensitive to pixel defects and a sensor with such defects may not yield aesthetically pleasing images. It is especially evident when defects are located in low frequency areas or at image contour edges. Edges in images are areas with strong intensity contrasts. A bad pixel in an imager device will show up as a bad area on the acquired image. The defective pixels may not work at all or, alternatively, they may be significantly brighter or dimmer than expected for a given light intensity. Depending on the desired quality and the intended application, a single defective pixel may sometimes be sufficient to cause the imager device containing the pixel to be discarded.

In most instances, however, a small percentage of defective pixels can be tolerated and compensated for. Numerous techniques exist for locating and correcting single defective pixels in an imager device. Correction of multiple defective pixels in a small area of an array, termed "cluster defects" or "defective pixel clusters," however, presents increased challenges. Accurate location of these pixel cluster defects is one of those challenges.

One simple technique for correcting defective pixels involves taking a signal from each pixel in an array and storing the pixel signal values in memory. During image processing, the saved value for a defective pixel can be replaced by a signal value which is based on one or more signals from the neighboring pixels of the defective pixel. For example, the defective pixel signal can be substituted for an adjacent pixel signal value or for an average of the signal values from more than one pixel in the neighboring area of the pixel array.

These substitution techniques rely on accurate knowledge of the defective pixel locations. One of the widely used methods for determining the locations of defective pixels is off-line testing performed at the time of imager device fabrication at a factory. The defective pixel location determined during this off-line testing can be stored in a non-volatile memory in the imager device. The main disadvantage to this approach is that the number of defects that can be corrected is limited by the size of non-volatile memory dedicated to this purpose. Another drawback of this approach is that it requires a separate manufacturing step for the identification and storage of the pixel defect locations on the imager chip itself.

On the other hand, "on-the fly" cluster correction methods, i.e., those performed during use of the imager device rather than at the time of manufacture, have difficulties distinguishing between "true" defects and small image elements in the presence of arbitrary image content, and therefore, can lead to a more destructive image. This is particularly true for detection of "true" cluster defects.

Accordingly, there is a need and desire for a method, apparatus and system capable of accurately locating pixel defects, for example, pixel cluster defects, in a pixel array during use of an imager device.

BRIEF DESCRIPTION OF THE DRAWINGS

FIG. 1 is a pixel array defect map that can be calibrated in accordance with an embodiment of the invention.

DETAILED DESCRIPTION OF THE INVENTION

Figure 2:
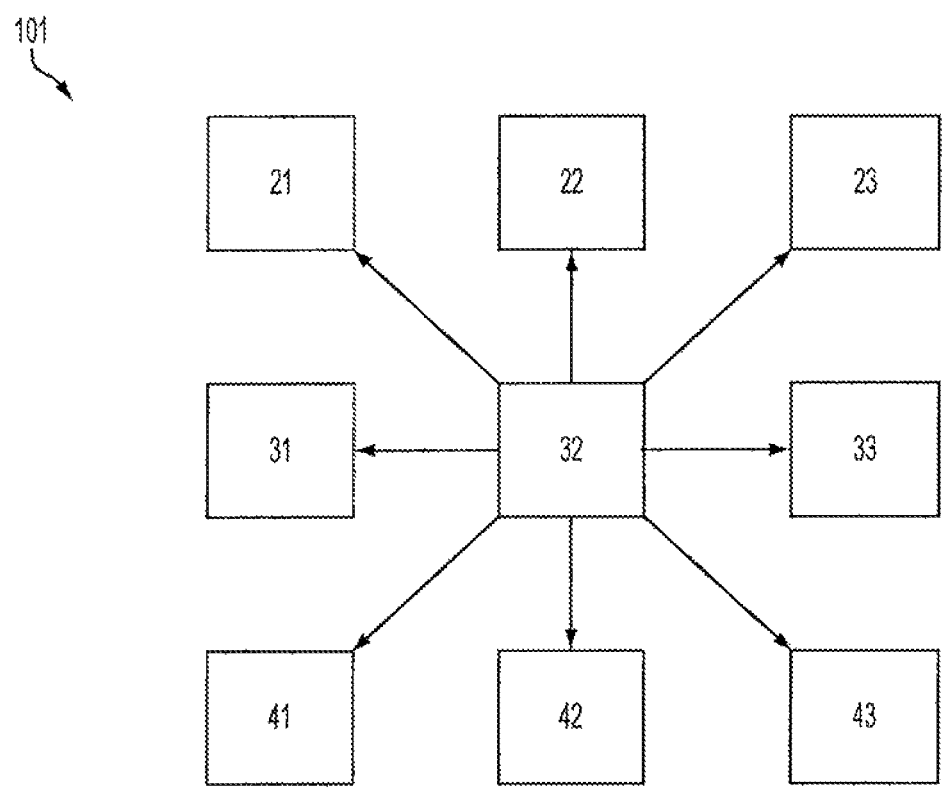
FIG. 2 depicts one set of neighboring pixels from the pixel array map shown in FIG. 1.

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, and electrical changes may be made. The progression of processing steps described is just one example embodiment; however, the sequence of steps is not necessarily limited to that set forth herein and may be changed as would be understood by those of skill in the art, with the exception of steps necessarily occurring in a certain order.

The term "pixel," as used herein, refers to a photo-element unit cell containing a photosensor device and associated structures for converting photons to an electrical signal.

In addition, although the embodiments of the invention are described as being employed with a CMOS imager, it should be appreciated that the disclosed embodiments could be used with any solid state imager technology, including CCD and others.

Method, apparatus and system embodiments are described below for performing on-the-fly adjustment of a pixel defect map for an imager device. The disclosed embodiments allow for the location and detection of pixel defects, including pixel cluster defects (either dark or bright), without the need for elaborate defect identification and storage during manufacturing of the imager device.

Most conventional defect detection methods analyze just one frame in an image. By analyzing just one frame of data, it is impossible, with these conventional methods, to distinguish between "true" pixel defects and image elements in the presence of arbitrary image content. A "true" pixel defect is constant and does not depend on the imaged scene. On the other hand, it is possible for pixel image elements that appear to be defects to change position as a scene is changing. For example, what produces a dark signal in one frame may be caused by movement in the imaged scene, rather than a pixel defect. Embodiments of the invention permit adjustment of a pixel defect map during use, such that non-defect pixels are not mistakenly mapped as defective for the life of the imager device.

The embodiments of methods, apparatuses and systems described herein detect the location of pixel defects, including cluster defects, and maintain an accurate map of such defects, which can be stored in a volatile or non-volatile memory. In accordance with the embodiments, a defect location method is performed to identify "true" defects and to classify the defect as either dark or bright. This is equally applicable to identifying and classifying "true" cluster defects. The location and classification information is saved, and can be updated, for further processing. After a pixel defect map is created using any of the disclosed embodiments, any method for correcting the signal from defective pixels may be used during subsequent image processing using the data created and stored in the pixel defect map.

The embodiments described herein can provide a map of true cluster defects, true individual pixel defects, or a combination of both. In addition, except where otherwise explained, the embodiments described herein can be used for either creating or updating pixel defect maps.

Now with reference to the Figures, where like numerals represent like elements, various embodiments are now described. FIG. 1 illustrates a pixel array defect map 100. The large "X" through pixel 32 near the center of the map 100 represents that pixel 32 has been identified as a defect pixel. In order for this pixel to be classified as a cluster defect, one or more additional pixels near the defect pixel 32 would have to be defective. For example, with reference to FIG. 2, for purposes of defining a cluster, one could examine the eight pixels in the neighboring set 101 immediately surrounding defect pixel 32. As shown in FIG. 1, if any one of these eight pixels in set 101 is defective, such as pixel 33, a cluster defect 102 exists. The pixel defect map 100 shows that pixels 32 and 33 are both defective, forming the cluster defect 102. The pixel defect map 100 also shows that pixel 61 is defective. Pixel 61 is identified as an individual pixel defect, however, because none of the eight pixels immediately surrounding pixel 61 contains a defect.

Figure 3:
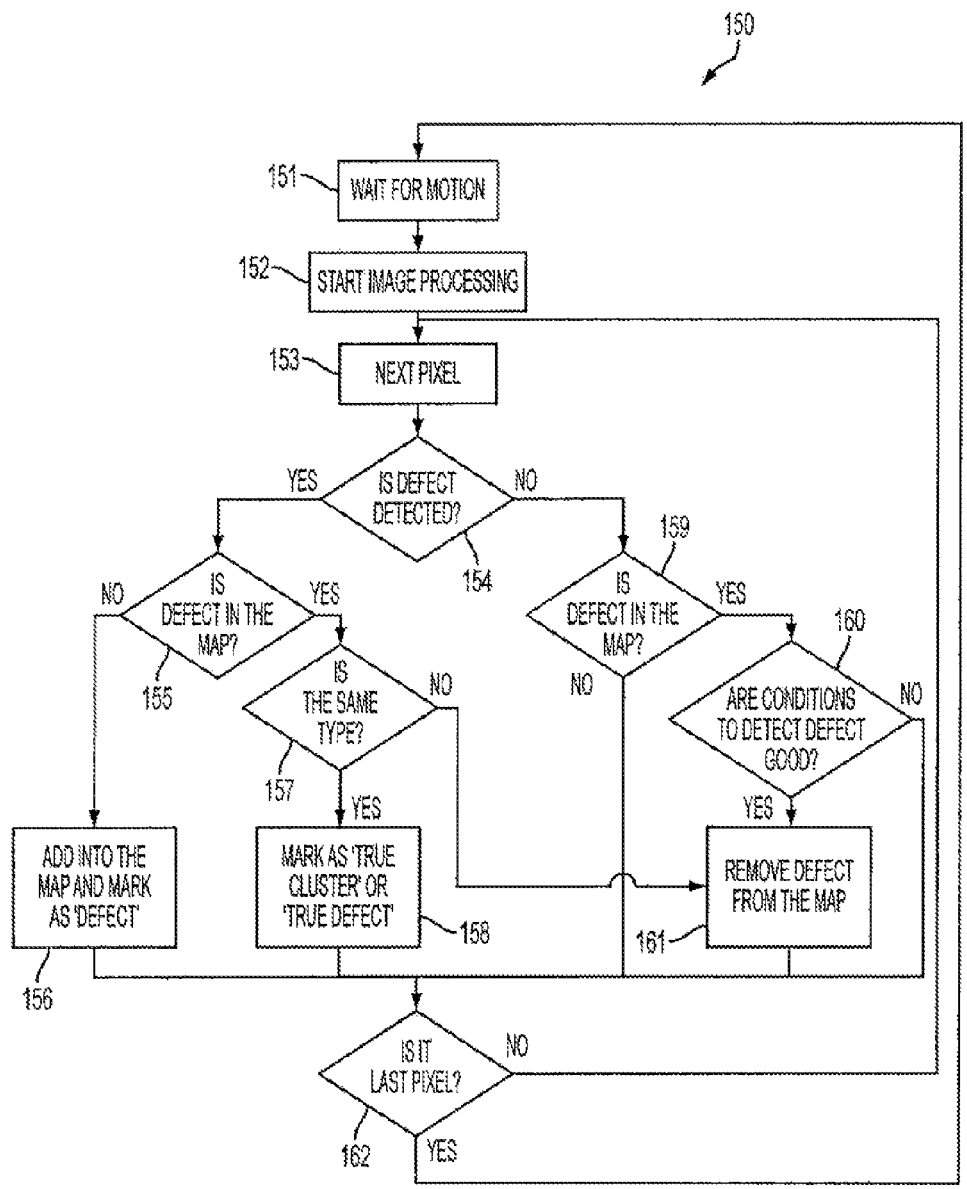
FIG. 3 shows a flowchart of a method for calibrating a cluster defect map in an imager in accordance with an embodiment of the invention.

FIG. 3 illustrates an on-the-fly method 150 of defect mapping and adjustment using the embodiment of the imager device illustrated in FIG. 4 and described below. The method 150 is now described with reference to FIGS. 1-4. At least some of the steps in the method 150 may be used, in a first instance, to create a pixel defect map 100. However, the flowchart as a whole illustrates a process for updating the pixel defect map 100. Accordingly, prior to the first step in method 150, a pixel defect map, such as e.g., pixel defect map 100, would be stored in a memory of or associated with the pixel array 240 of the imager device 300. The stored pixel defect map 100 may be created on-the-fly or during manufacturing of the imager device 300 using any known technique for pixel defect mapping, or using at least part of method 150.

The method 150 is initiated by a triggering event (at step 151) which determines that the detected image has changed. As shown, the triggering event (at step 151) may be, for example, detection of motion, performed using known motion detection methods. Other triggering events could also be implemented at step 151, including an automatic start mechanism at a certain pre-determined time. The remaining steps of method 150 are performed to adjust, if necessary, the saved defect map 100 that was established prior to the method-triggering event.

At step 152, image processing begins. This processing includes exposure of an image, which, can provide, for each pixel, a readout of a pixel reset Vrst and pixel light signal Vsig from each of the pixels in pixel array 240, which are subtracted to produce a pixel output signal. Next, for an individual pixel-under-test, e.g., pixel 32, at step 153, the readout pixel output signals for that pixel and its neighboring pixels are analyzed. At step 154, a determination whether the pixel-under-test 32 is a defect pixel and whether a pixel defect cluster is detected at that pixel location is made. For example, if pixel 32 is the pixel-under-test at step 153, the pixel output signals in the neighboring set 101 of pixels will be examined. The determination of a defect cluster at step 154 thus involves determining whether pixel 32 as well as one or more pixels in the neighboring set 101 include pixel defects of a similar character (i.e., defectively bright or dark).

For purposes of labeling pixels as pixel defects, known methods may be employed. For example, pixel 32 could be labeled as a pixel defect if its pixel output signal is significantly different than those signals of its neighboring set 101. If the pixel output signal from pixel 32 is much higher than those in its neighboring set 101 by some pre-determined threshold amount or percentage, the pixel 32 could be deemed a "BRIGHT" pixel; conversely, if the pixel output signal from pixel 32 is much lower than those in its neighboring set 101, the pixel 32 could be deemed a "DARK" pixel. As another example, pixel defect thresholds $V_{DARK}$ and $V_{BRIGHT}$ defining the signal values at which a pixel is determined to be, respectively, a "DARK" or "BRIGHT" defect pixel could be set. Thus, if the pixel output signal from pixel 32 is greater than $V_{BRIGHT}$ or less than $V_{DARK}$, pixel 32 would be respectively labeled in pixel defect map 100 as a BRIGHT or DARK defect pixel.

Using any of these, or other, pixel defect identification techniques, at step 154, a defect cluster will be detected if more than one similarly labeled pixel defect exists in the neighboring set 101 under consideration. The type of cluster is also identified at this step as including multiple "BRIGHT" or "DARK" pixel defects in an area.

If a pixel defect is detected at step 154, the method continues at step 155. For example, if a cluster defect is detected at step 154 associated with pixel-under-test 32, a determination is made as to whether this cluster, for example cluster 102, exists in the previously stored pixel defect map 100 (step 155). If the cluster 102 was not previously in the map, the map 100 is updated to include the cluster location and to mark the cluster with a temporarily label such as "DEFECT" (at step 156). It should be noted that in the present example, it is presumed that the defect was already in the pixel defect map 100, which would yield a "Yes" response at step 155 (described below). Those clusters which are marked "DEFECT," may be mapped as a true cluster if they are again found to be the same type of defect cluster in the next run through the method 150 (for example, when the next imaged scene is captured).

If at step 155, the identified cluster 102 was previously in the map, a determination is made at step 157 as to whether the cluster 102 is the same type as the type previously detected. Specifically, this step 157 compares the type (either BRIGHT or DARK) of the cluster currently identified to information about the cluster in the stored pixel defect map 100. If the cluster 102 is determined to be the same type of cluster as previously classified, it is marked at step 158 as a "TRUE CLUSTER." If the presently identified cluster 102 is not the same type as was previously classified, it is not a true cluster; instead, this defect is the result of imaging errors. In that case, the method moves to step 161 where the defect cluster is removed from the defect map 100.

It should be understood that a similar series of steps would be performed if it is found that pixel-under-test 32 is an individual pixel defect, but not part of a cluster defect. Specifically, the location of the pixel-under-test 32 would be compared at step 155 with the information in the stored defect map 100 for that location. If the same individual defect of the same classification was previously located at the pixel-under test 32 area, the pixel is determined to be a "TRUE DEFECT" defect and is marked as an individual "TRUE DEFECT" at step 158.

If at step 154 a defect or defect cluster is not detected, the method 150 continues at step 159 where a determination is made as to whether the pixel-under-test 32 was previously identified as a pixel defect or as part of an identified cluster 102 in the pixel defect map 100 created prior to the triggering event 151. Put another way, step 159 asks whether this pixel location in the pixel defect map 100 was tagged as a pixel defect or as part of a defect cluster. If this pixel location was not previously part of a cluster in the pixel defect map 100, the method 150 proceeds to step 162. If, however, the present pixel-under-test 32 is not currently part of a cluster defect, but it is determined at step 159 that it was part of a cluster in the stored pixel defect map 100, the method proceeds to step 160. Similarly, if the pixel-under test 32 is not currently identified as a pixel defect, but it is determined at step 159 that it was marked as a defect pixel in the stored pixel defect map 100, the method 150 also continues at step 160.

At step 160, it is determined whether the conditions for detecting pixel defects and defect clusters are "good." Specifically, step 160 is utilized so that defect clusters 102 are not removed from the pixel defect map 100 if some conditions external to the imaged scene have made detecting defect clusters presently difficult. For example, if a pixel has reached saturation, further processing of pixel output signals could be affected such that detecting "true" clusters is difficult. Accordingly, conditions are checked at step 160, for example, by comparing pixel output signals to a saturation threshold. Any type of external condition can be checked at this stage if desired. In addition, the conditions that are considered at step 160 may be different for identifying DARK and BRIGHT pixel defects.

At this point, if acceptable conditions have been found at step 160, the method proceeds to step 161 where the previously detected pixel defect or defect cluster 102 is removed from the pixel defect map 100. For the present example, this means that what was previously considered a defect cluster 102 was not a true defect for the pixel sensor, but rather, was an image element that created a falsely defective pixel output signal. Thus at least one of the pixels that created a defective pixel output signal previously in defect cluster 102, is now producing normal output signals which can be utilized in reproducing the sensed image. The stored pixel defect map 100 is thus updated appropriately.

Figure 4:
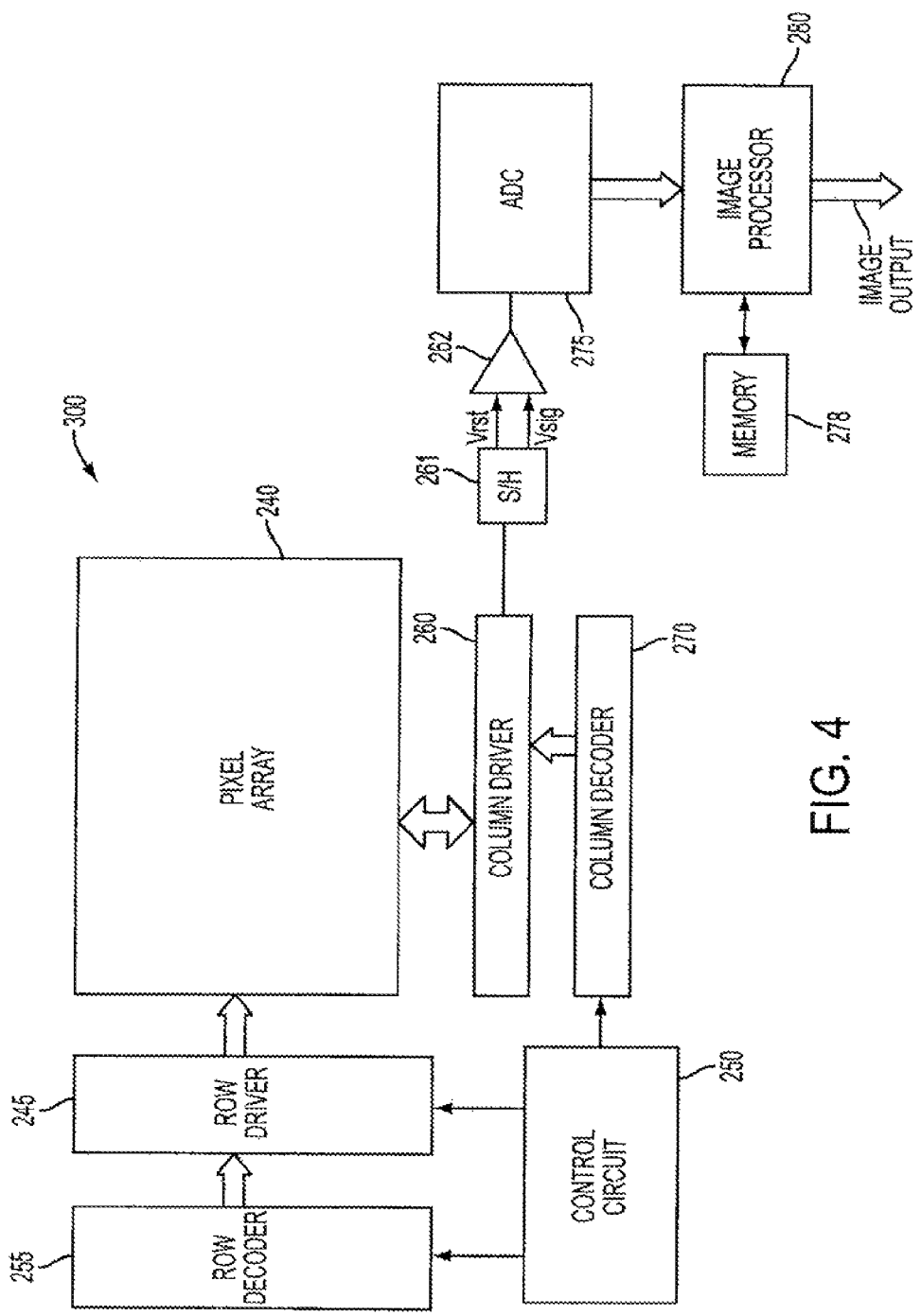
FIG. 4 shows a block diagram of an imager constructed in accordance with an embodiment of the invention.

The method 150 proceeds at step 162 with an inquiry into whether the pixel that was just considered (i.e., pixel 32) is the last pixel in the array 240 (FIG. 4). If not, the method 150 is repeated beginning with step 153 for the next pixel. If, however, the pixel 32 considered was the last pixel in the array 240, the updated pixel defect map 100 is available for use in further image processing. Those pixels identified as "TRUE" individual defects can be corrected using known pixel correction techniques. Those pixels identified as part of a "TRUE CLUSTER" can be corrected using substituted pixel output signals from adjacent non-defect pixels. For example, the pixel output signal values for pixels identified as being part of a "TRUE CLUSTER" can be corrected using the methods described in U.S. Patent Pub. No. 2006/0044425, assigned to Micron Technology, Inc., and incorporated herein by reference.

As stated above, FIG. 4 illustrates an imager device 300 having a pixel array 240 which may be used to implement the method 150 described above. Row lines of the array 240 are selectively activated by a row driver 245 in response to row address decoder 255. A column driver 260 and column address decoder 270 are also included in the imaging device 300. The imager device 300 is operated by the timing and control circuit 250, which controls the address decoders 255, 270. The control circuit 250 also controls the row and column driver circuitry 245, 260.

A sample and hold circuit 261 associated with the column driver 260 reads a pixel reset signal Vrst and a pixel image signal Vsig for selected pixels of the array 240. A differential signal (Vrst−Vsig) is produced by differential amplifier 262 for each pixel and is digitized by analog-to-digital converter 275 (ADC). The analog-to-digital converter 275 supplies digitized pixel signals to an image processor 280 which may be implemented in hardware, software using a processor, or a combination of hardware and software. Image processor 280 is constructed to perform the defect map calibration method 150 of the present invention, possibly in conjunction with other defect location and correction processes and any other image processing operations as described herein and as known in the art. A pixel defect map 100 created in accordance with the invention can be stored in memory 278 associated with the image processor 280 in the imager device 300 and could be used in creating corrected output signals for defective pixels by an image processor 280, which in turn, outputs a digital image.

Figure 5:
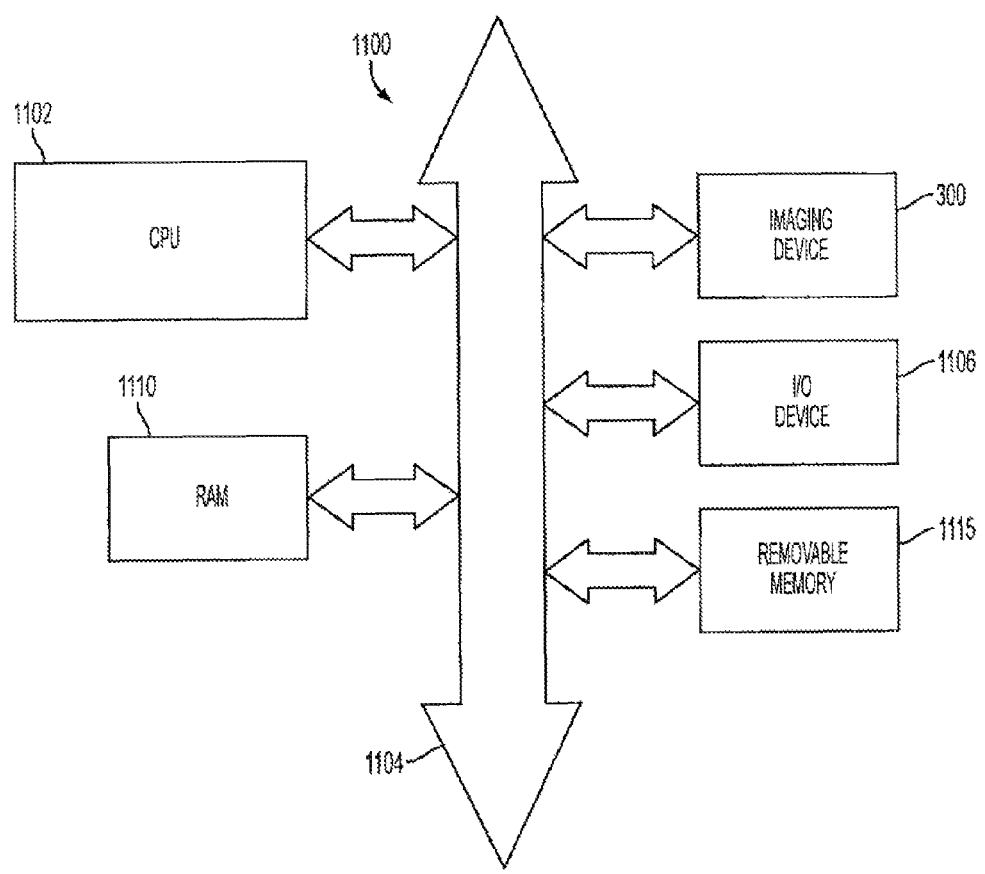
FIG. 5 shows a processor system, for example a camera system, incorporating at least one imager device constructed in accordance with an embodiment of the invention.

FIG. 5 shows system 1100, a simplified processor system having the imager device 300 (FIG. 4) that implements embodiments of the invention. The system 1100 is exemplary of a system having digital circuits that could include imager device 300. Without being limiting, such a system could include a computer system, still or video camera system, scanner, machine vision, video phone, and auto focus system, or other imager applications.

System 1100, for example a camera system, generally comprises a central processing unit (CPU) 1102, such as a microprocessor for controlling camera operations, that communicates with one or more input/output (I/O) devices 1106 over a bus 1104. Imaging device 300 also communicates with the CPU 1102 over the bus 1104. The processor system 1100 also includes random access memory (RAM) 1110, and can include removable memory 1115, such as flash memory, which also communicate with the CPU 1102 over the bus 1104. The imaging device 300 may be combined with the processor, such as a CPU 1102, with or without memory storage on a single integrated circuit or on a different chip than the CPU 1102.

While embodiments of the invention have been described in derail in connection with exemplary embodiments known at the time, it should be readily understood that the invention is not limited to such disclosed embodiments. Rather, the embodiments can be modified to incorporate any number of variations, alterations, substitutions or equivalent arrangements not heretofore described.

For example, while embodiments of the invention have been described in which either pixel cluster defects or individual pixel defects are detected and compared with a pixel defect map and used to update the map, the embodiments may be modified to provide for detection of individual pixel defects and pixel defect clusters simultaneously, to generate data used to create a pixel defect map or update an existing pixel defect map. In addition, the invention is not limited to the type of imager device in which it is used. Although for illustrative purposes a CMOS imager device has been described, the invention may also be implemented with a CCD or other imager device.

What is claimed as new and desired to be protected by Letters Patent of the United States is:

1. An imager device comprising:
   an array of pixel image sensors for providing a plurality of pixel output signals;
   a memory for storing a pixel defect map, the stored map having data on a plurality of locations, each location corresponding to a pixel image sensor in the array; and
   a processor for determining if a pixel defect cluster is detected at a first location using said pixel output signals corresponding to the first location and at least one neighboring location in the array and, if a pixel defect cluster is detected at the first location based on analyzing more than one frame of an image, updating the stored pixel defect map based on a type of the pixel defect cluster,
   wherein the processor removes the pixel defect cluster at the first location from the stored map if the type of the pixel defect cluster at the first location is different from the type of a defect cluster that was previously present at the first location in the stored map.

2. The imager device of claim 1, wherein the processor determines whether a pixel defect cluster exists at the first location based on comparing the data in the stored map associated with the first location and the at least one neighboring location to current data on the received pixel output signals.

3. The imager device of claim 1, wherein the processor updates the stored map based on the existence of the pixel defect cluster at the first location, and a comparison of the type of the pixel defect cluster at the first location to the type of defect cluster that was previously present at the first location in the stored map.

4. The imager device of claim 3, wherein the processor identifies the pixel defect cluster at the first location from the stored map as a true defect cluster if the type of the pixel defect cluster at the first location is the same as the type of defect cluster that was previously present at the first location in the stored map.

5. The imager device of claim 1, wherein the processor determines whether the pixel defect cluster is a "BRIGHT" pixel defect type or a "DARK" pixel defect type.

6. The imager device of claim 1, wherein if a pixel defect cluster is detected at the first location, the processor adds the pixel defect cluster to the first location in the stored map if no pixel defect cluster was previously detected at the first location in the stored map.

7. The imager device of claim 1, wherein the data corresponding to a location in the map includes data related to pixel location, pixel defect cluster information and the type of the pixel defect cluster.

8. The imager device of claim 1, wherein if a pixel defect cluster is not detected at the first location and a pixel defect cluster was previously present at the first location in the stored map, the processor removes the pixel defect cluster at the first location in the map when conditions for detecting a pixel defect cluster meet pre-determined criteria.

9. The imager device of claim 8, wherein the pre-determined criteria include comparing pixel output signals to a saturation threshold.

10. A camera system comprising the imager device of claim 1.

11. An imager device comprising:
    an array of pixel image sensors for providing a plurality of pixel output signals;
    a memory for storing a pixel defect map, the stored map having saved data on a plurality of locations, each location corresponding to a pixel image sensor in the array; and
    a processor for updating the stored pixel defect map using the pixel output signals to locate current pixel defects in accordance with pixel defect criterias,
    wherein for every current pixel defect, if the corresponding location in the stored map was previously marked as defective, the processor removes the defect mark for the corresponding location in the map when the saved data for the corresponding location in the map is different from current data of said respective current pixel defect.

12. The imager device of claim 11, wherein if the corresponding location in the stored map was previously marked as defective, the processor marks the corresponding location in the map as a true defect when the saved data for the corresponding location in the map is the same as the current data of said respective current pixel defect.

13. The imager device of claim 11, wherein if the corresponding location in the stored map was not previously marked as defective, the processor marks the corresponding location in the map as defective.

14. The imager device of claim 11, wherein for every pixel defect location in the map that does not correspond to a current pixel defect location, the processor removes the defect mark for the corresponding location in the map when conditions for detecting a pixel defect meet pre-determined criteria.

15. The imager device of claim 14, wherein the pre-determined criteria include comparing the pixel output signals to a saturation threshold.

16. The imager device of claim 11, wherein the processor uses the pixel output signals for the corresponding location and at least one neighboring location in the map to locate current cluster defects.

17. The imager device of claim 16, wherein the processor updates the stored map according to a defect type corresponding to a current cluster defect, the processor identifies the defect type by comparing the pixel output signals to threshold bright and dark values.

18. A camera system comprising the imager device of claim 11.

\* \* \* \* \*

UNITED STATES PATENT AND TRADEMARK OFFICE
CERTIFICATE OF CORRECTION

| | | |
|---|---|---|
| PATENT NO. | : 8,582,005 B2 | Page 1 of 1 |
| APPLICATION NO. | : 13/052660 | |
| DATED | : November 12, 2013 | |
| INVENTOR(S) | : Igor Subbotin | |

It is certified that error appears in the above-identified patent and that said Letters Patent is hereby corrected as shown below:

In the Claims:

In column 8, line 31, in Claim 11, delete "criterias," and insert -- criteria, --, therefor.

Signed and Sealed this
Eighteenth Day of February, 2014

Michelle K. Lee
*Deputy Director of the United States Patent and Trademark Office*